(12) United States Patent
LeMay et al.

(10) Patent No.: US 8,961,306 B2
(45) Date of Patent: Feb. 24, 2015

(54) FEEDBACK TO PLAYER OF DEVICE CONNECTION STATE

(75) Inventors: Steven G. LeMay, Reno, NV (US);
Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 11 days.

(21) Appl. No.: 13/466,879

(22) Filed: May 8, 2012

(65) Prior Publication Data
US 2013/0303263 A1 Nov. 14, 2013

(51) Int. Cl.
*A63F 13/12* (2006.01)

(52) U.S. Cl.
USPC ............... 463/31; 463/30; 463/32; 463/40; 463/41; 463/42

(58) Field of Classification Search
USPC .......................... 463/30–32, 40–42
See application file for complete search history.

(56) References Cited

U.S. PATENT DOCUMENTS

| | | | | |
|---|---|---|---|---|
| 6,141,711 | A * | 10/2000 | Shah et al. ............... | 710/302 |
| 6,676,522 | B2 | 1/2004 | Rowe et al. | |
| 7,167,724 | B2 * | 1/2007 | Yamagishi ............... | 455/556.1 |
| 7,611,409 | B2 | 11/2009 | Muir et al. | |
| 2005/0287852 | A1 * | 12/2005 | Sugawara et al. ......... | 439/135 |
| 2007/0021198 | A1 * | 1/2007 | Muir et al. ................ | 463/29 |
| 2007/0202941 | A1 | 8/2007 | Miltenberger et al. | |
| 2008/0076572 | A1 | 3/2008 | Nguyen et al. | |
| 2009/0098943 | A1 | 4/2009 | Weber et al. | |
| 2010/0012715 | A1 * | 1/2010 | Williams et al. .......... | 235/375 |
| 2010/0016075 | A1 * | 1/2010 | Thomas ..................... | 463/30 |
| 2010/0069160 | A1 * | 3/2010 | Barrett et al. ............. | 463/46 |
| 2010/0087241 | A1 * | 4/2010 | Nguyen et al. ............ | 463/17 |
| 2010/0234099 | A1 * | 9/2010 | Rasmussen et al. ...... | 463/29 |
| 2011/0065497 | A1 * | 3/2011 | Patterson, Jr. ............ | 463/25 |
| 2012/0129611 | A1 * | 5/2012 | Rasmussen et al. ...... | 463/43 |
| 2012/0324135 | A1 * | 12/2012 | Goodman et al. ........ | 710/304 |

OTHER PUBLICATIONS

Hewlett-Packard Development Company, L.P., "HP Docking Stations for Performance, Workstation and Balanced Mobility HP Notebook PCs", Jan. 16, 2009, <http://h18000.wwwl.hp.com/products/quickspecs/13068_na/13068_na.html>.*

* cited by examiner

*Primary Examiner* — Justin Myhr
(74) *Attorney, Agent, or Firm* — Foley & Lardner LLP

(57) ABSTRACT

A gaming system compatible with patron-controlled portable electronic devices, such as smart phones or tablet computers, is described. Electronic gaming machines (EGMs) within the gaming system can be configured to allow play of wager-based games and interact with portable electronic devices. The EGMs can be configured with one or more of mechanisms that enable a user to establish and then determine a status of a communication session between a portable electronic device and the EGM. In addition, the EGMs can be configured with one or more mechanisms that enable a user to determine a status of a transaction or application involving a portable electronic device.

24 Claims, 6 Drawing Sheets

FEEDBACK TO PLAYER OF DEVICE CONNECTION STATE

BACKGROUND

1. Field of the Described Embodiments

The described embodiments relate generally to gaming systems, such as gaming systems deployed in a casino enterprise. More particularly, apparatus and method for enabling communications between an electronic gaming machine and portable electronic devices are described.

2. Description of the Related Art

Developing and maintaining a loyal customer base is a critical component of operating a successful casino enterprise. To develop a loyal customer base, casino enterprises attempt to generate interactions with their patrons that provide a unique and personalized game playing experience. As an example, casino enterprises offer patrons the opportunity to participate in a loyalty program. Via the loyalty program, patrons are offered various promotions and free items that encourage the patron to return to the casino.

In the loyalty program, the promotions can be tailored to the patron's preferences. As an example, if preferred, a patron can choose to receive promotional credits for game play on an electronic gaming machine and information regarding this preference can be stored to an account associated with the loyalty program. In general, information regarding the patron's preferences in regards to promotions as well as other activities within the casino enterprise, such as food, drink and room preferences, can be stored to their account associated with the loyalty program. The patron information stored in the account can be used to personalize the service and the game playing experience provided by the casino enterprise.

An ever increasing portion of patrons that visit casinos are regularly carrying portable electronic devices, such as smart phones, laptops, netbooks and tablet computers, on their person. The portable electronic devices provide 1) a means of communication allowing the patron to communicate with other individuals within or outside of a casino via a number of different communication modes, 2) a source of news and information, 3) a portal to the patron's on-line activities, such as social media applications, 4) support for entertainment features, such as audio/video playback and gaming applications, 5) a repository for personal information, such as financial information that enables financial transactions in a mobile wallet applications and 6) a means of capturing information, such as video images and audio recordings. Thus, portable electronic devices, such as smart phones, are becoming essential tools and in some instances, the primary electronic interface for many individuals.

The popularity of portable electronic devices allows for the possibility of utilizing their capabilities to further personalize and enhance the gaming experience in a casino gaming environment. In view of the above, methods and apparatus are desired that allow for complementary interactions with a portable electronic devices within a casino environment, such as when a patron is participating in game play on an electronic gaming machine.

SUMMARY OF THE DESCRIBED EMBODIMENTS

A gaming system compatible with patron-controlled portable electronic devices, such as smart phones, netbooks, laptops, tablet computers, smart cards and memory sticks, is described. The gaming system can include a server coupled to a number of different electronic wager-based gaming machines. The EGMs can be located within a single gaming establishment, such as a casino, or the EGMs can be distributed across multiple gaming establishments within a gaming enterprise.

The EGMs can be configured to actively communicate with user-controlled portable electronic devices, generate transactions involving the portable electronic devices and execute applications associated with the portable electronic devices. Many of these transactions and applications may require a transfer of data between the EGM and a portable electronic device. Thus, the EGMs can include one or more output mechanisms that provide feedback information related to the EGM-portable electronic device connection state.

One aspect of the embodiments described herein is related to a wager-based electronic gaming machine (EGM) configured to output mobile device related information. The EGM can be generally characterized as comprising: 1) a cabinet; 2) a game controller, disposed within the cabinet, configured to control a wager-based game played on the EGM; 3) a value input device for accepting cash or credits used for wagers on the wager-based game; 4) a value output device for dispensing at least credits redeemable for cash; 5) a player input panel communicatively coupled to the game controller configured to receive inputs associated with the wager-based game; 6) a main display communicatively coupled to the EGM configured to show an outcome to a wager-based game; and 7) a mobile device related indicator integrated into a surface on the EGM at a location visible to a player for conveying mobile device related information to a user of the EGM. A symbol and/or text associated with the mobile device related indicator is integrated into the surface such that the symbol and/or the text is more visible when a lighting mechanism located underneath the surface is activated.

Another aspect of the described embodiments is related to a wager-based electronic gaming machine (EGM) configured to output mobile device related information. The EGM can be generally characterized as comprising: 1) a cabinet; 2) a game controller, disposed within the cabinet, configured to control a wager-based game played on the EGM; 3) a value input device for accepting cash or credits used for wagers on the wager-based game; 4) a value output device for dispensing at least credits redeemable for cash; 5) a player input panel communicatively coupled to the game controller configured to receive inputs associated with the wager-based game; 6) a main display communicatively coupled to the EGM configured to show an outcome to a wager-based game; and 7) a display for outputting one or more mobile device related indicators for conveying mobile device related information to a user of the EGM. At least one of the indicators can be for conveying whether a mobile device is currently in communication with a gaming system.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

Figure 1:
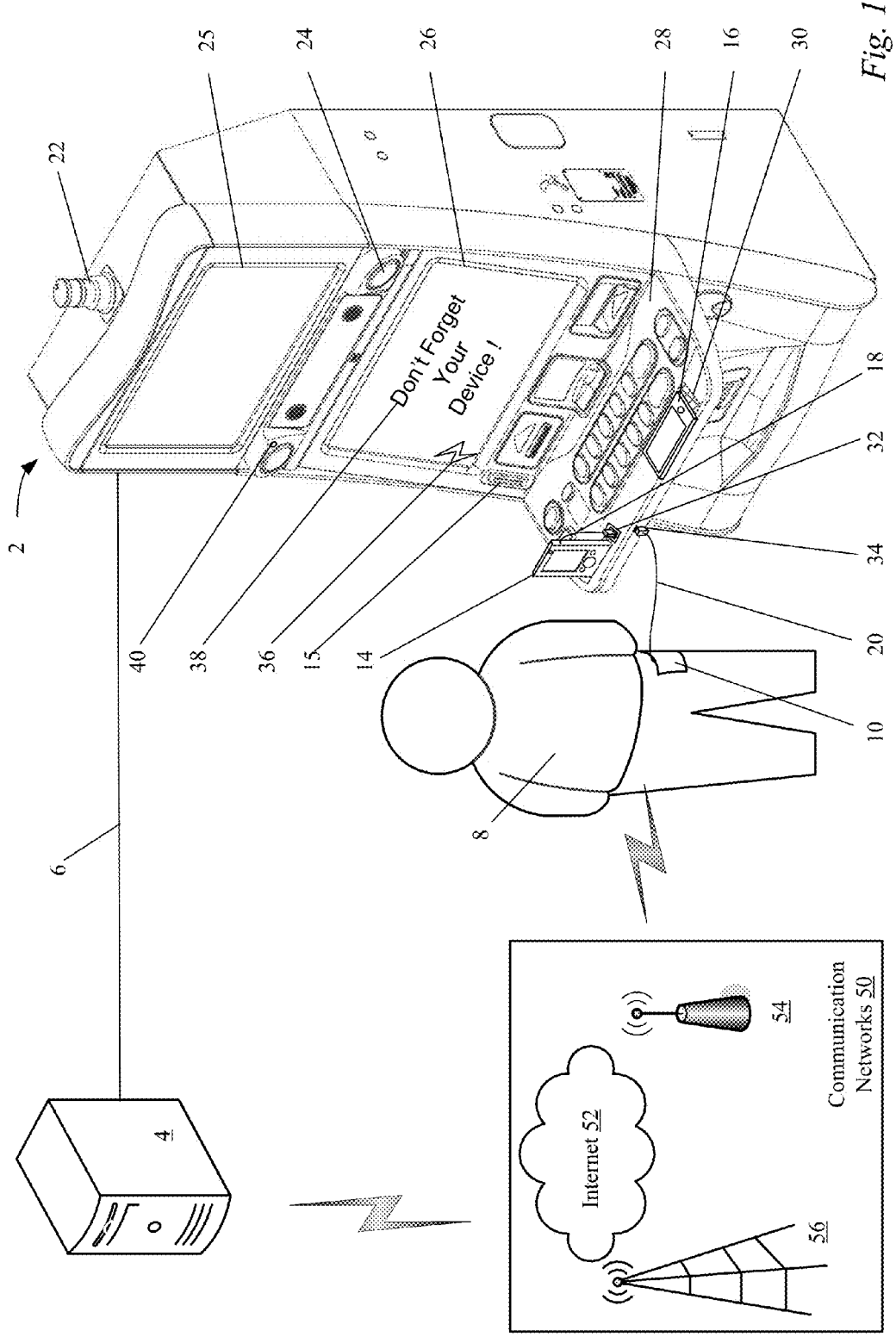
FIG. 1 shows a block diagram of a gaming system including EGMs, a server and mobile devices in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with portable electronic devices controlled by users of the gaming system is described. The gaming system can include a number of features that encourage and enable the use of portable electronic devices, such as smart phones and tablet computers, in a casino gaming environment. In particular embodiments, EGMs can be enabled to establish secure communication connections with portable electronic devices, such as smart phones. EGMs can be configured to provide various functions associated with the use of portable electronic devices, such as but not limited to providing remote network access to the portable electronic devices, receiving and sending information to the portable electronic devices and providing power to the portable electronic devices. The functions involving sending or receiving information to the mobile devices can be utilized in applications related to player tracking, funds transfers, social media and other promotional activities related to casino gaming.

The EGMs can include a landing area for placing or swiping a portable electronic device and/or a number of devices used to generate status indicators and/or feedback information related to the functions available to portable electronic devices on the EGM. For example, the status indicators and/or feedback information can be related to a connection state between the EGM and a portable electronic device or the portable electronic device and a remote device. As another example, the status indicators and/or feedback information can be related to a state of a transaction involving a portable electronic device. In yet another example, the status indicators and/or feedback information can be related to a service associated with a portable electronic device, such as a charging service that allows the portable electronic device to be charged at the EGM or network access service that allows the portable electronic device access a wide area network, such as the Internet, via a communication connection provided through the EGM.

Details of embodiments involving feedback information related to mobile device connection states are described with respect to the following figures. Device interactions within a gaming system including EGM-mobile device communications are discussed with respect to FIG. 1. With respect to FIG. 2, a landing area for a portable electronic device including one or more mechanisms for indicating status information associated with portable electronic devices are described with respect to FIG. 3. A method of providing status information related to portable electronic devices from an EGM enabled to communicate with a portable electronic device is described with respect to FIG. 3. Finally, with respect to FIGS. 4, 5 and 6. Additional details of gaming devices including an EGM and the gaming system are described.

EGM-Mobile Device Interfaces

In this section, some examples of interfaces on an EGM that enable mobile device interactions are described. FIG. 1 shows an EGM 2 with interfaces for interacting with a portable electronic device. The EGM 2 can be part of a gaming system that includes a number of gaming devices and servers, such as 4. The communication connection 6 between the EGM 2 and the server 4 can be wired, wireless or a combination of wired and wireless communication links depending on the local and/or wide area network topology used within the gaming system. The EGM 2 can include a) displays, such as a main display 26 on which a wager-based game can be output, b) audio devices, such as speaker 24 for outputting sounds from the EGM and c) a player input panel 28 including buttons for making inputs associated with the play of the wager-based game. These devices can be controlled by a game controller (not shown) located within the cabinet of the EGM 2. Further details of the EGM's game controller and other gaming related methods that can be utilized within the gaming system are described with respect to FIGS. 4 and 5.

The EGM 2 can include a number of different types of interfaces that enable interactions with a portable electronic device, such as a smart phone or a tablet computer. One type of interface is a power interface. Another type of interface, described in more detail below is a communication interface. Via a power interface, power can be supplied to the portable electronic device. For instance, power interfaces 32 and 34 can be configured to receive a connector that allows an electronic device to be electrically coupled to the EGM 2. In one embodiment, the power interface 32 and 34 can be configured to accept a USB connector and thus, can be compatible with USB connector power requirements. Other types of power interfaces, such as a standard 120V receptacle can be provided.

In general, one or more power interfaces can be provided. When two or more power interfaces are provided the interfaces can employ the same or different power configurations. For instance, when two interfaces are provided, both can be configured to accept a USB connector or a first can be configured to be compatible with a USB connector while a second can be compatible with a two pronged connector. Thus, the voltage and current supplied by each power interface can vary from interface to interface depending on the power standard for which the power interface is configured. The one or more power interfaces can be located on different surfaces of the EGM 2. For instance, power interface 32 is located on an upper surface of the player input panel 28 and power interface 34 is located on a front surface of the player input panel 28. In other examples, the power interfaces can be located on a different surface, such as a front surface of the EGM cabinet.

A connector 18 is shown leading from power interface 32 to portable device 14 positioned on the player input panel 28 and a connector 20 is shown leading from power interface 20 to a portable device (not shown) located in the pocket 10 of user 8. At the device end, the connector, such as 18 or 20, can include a power interface compatible with the portable device, such as device 14 or the device located in the pocket of user 8. At the EGM end, the connector, such as 18 or 20, can include a power interface compatible with the EGM power interface. The interfaces at each end of the connector can be coupled via a cord. Typically, the interface between a connector (e.g., 18 or 20) and a portable device varies widely from model to model and from manufacturer to manufacturer where the interface at the device end can transmit communications and/or power to the portable device. Thus, in one embodiment, the connector, such as 18 and 20, can be provided by the user, such as 8.

In yet another embodiment, an interface 30 for wireless power transmission can be provided on the EGM 2. As an example, player input panel 28 includes a wireless power interface 30, such as a Powermat™ (Powermat Inc, Commerce Charter Township, Mich.). The wireless power interface can be compatible with a number of different types of devices. A portable device 16 is shown resting on the wireless power interface in a position that allows it to receive power via the wireless power interface 30. Power to the wireless power interface can be switched on and off depending on the machine status.

In particular embodiments, the interfaces 30, 32 and 34 can include sealing mechanisms that are configured to protect the interface in the case of spill, such as a user spilling a drink on the interface. Further, the interfaces can be configured to protect against electrostatic discharge (ESD). The ESD protection can include isolation circuits, filtering circuits, and suppression components, such as multilayer varistors, silicon diodes, and polymer-based suppressors. Suppression components protect the circuit by clamping the ESD voltage to a level that the circuit can survive. Connected in parallel with the signal lines, the suppressors clamp the ESD voltage and shunt the majority of the ESD current away from the data line, and the protected chip, to the appropriate reference. Typical references are the power rail and chassis ground.

In alternate embodiments, one or more of the interfaces 30, 32 and 34, can be configured as power and data interfaces or as a data only interface. For instance, via interface 32 and connector 18, power and data can be transmitted from the EGM 2 to the portable device 14 or only data can be transmitted between the EGM 2 and the device 14. In one embodiment, for security purposes, when a data interface is provided, the communications can be uni-directional such that only data can be sent from the EGM 2 to the portable device via the data interface. In other embodiments, the return communications that can be sent from the device to the EGM 2 and recognized by the game controller can be very limited for security purposes. The format of the return communications can be described a communication protocol (and/or implemented with an application program interface).

The EGM 2 can support one or more wireless communication interfaces for communicating with a portable device, such as 14 or 16. For instance, a first communication wireless interface can support Bluetooth™ communications, a second wireless communication interface can support communications via Wi-Fi™ (compatible with IEEE 802.11 standards) and a third wireless communication interface can support a NFC communication protocol (see FIG. 4 for more detail). In one embodiment, a wireless communication interface can be integrated or located proximate to the wireless power interface. For example, a wireless communication interface supporting an NFC communication protocol can be integrated with the wireless power interface 30. Thus, when the device 16 is placed near the wireless communication interface 30, NFC formatted communication can occur between the device 16 and the EGM 2. In other embodiments, the wireless communication interfaces can be placed in other locations within the EGM 2. Thus, the placement near the wireless power interface is discussed for the purposes of illustration only.

In one embodiment, the NFC communication can be used to exchange information to allow a secure pairing to be established between a user-controlled device and the EGM 2. For instance, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device pair directly with another without having to first join a local network. The method makes it possible to share media from a phone, play multiplayer games or otherwise communicate directly, even when no router exists. Via pairing between the EGM 2 and portable electronic device, a portable electronic device may be able to utilize some of the functionality of secondary devices residing on the EGM 2. For instance, it may be possible for a player to print something from their portable electronic device using the printer on the EGM 2 when it is paired to the EGM 2.

The EGM 2 can include one or more support structures configured to receive a portable electronic device. The support structures can be integrated into the EGM cabinet such that a device placed in the support structure isn't easily knocked out of the support structure and placement of the device doesn't block access to input buttons on the EGM 2 during game play. The support structure can be configured to support a device various positions, such as upright, on its side or on its back. Further, the support structures can be configured to allow a device received in the support structure to be positioned in a preferred orientation. For instance, device 14 is placed in a support structure with a receptacle built into the player input panel 28 that allows the device to be orientated in an upright position. As another example, device 16 is placed flat on a ledge of the player input panel 28. The ledge can include an indentation or a high-friction material (anti-slip) that is designed to keep the device 16 from sliding off of the ledge. Support structures can be placed in other locations on the EGM cabinet and these examples are provided for the purposes of illustration only.

The support structure can include a stand or bracket for supporting the device. In one embodiment, the support structure can include a switch that is activated by a weight of the portable electronic device. The switch may be used for device detection purposes. The support structure can be sealed to provide protection in the event of spills. Further, it can include other tamper-resistant features, such as features that prevent the internal elements of the EGM 2 from being exposed. In one embodiment, a NFC interface can be located proximate to the support structure, such that it can be utilized when a device is placed in the support structure.

In alternate embodiments, the support structure, data interfaces and power interfaces can be incorporated into a secondary device utilized on the EGM 2. For instance, one or more of a support structure, a power interface or a wireless interface can be incorporated into a player tracking unit with a smart interface board (SMIB), a card reader, a bill validator or a printer. Further, all or a portion of the control of the power interfaces and/or wireless interface in the manner described herein can be performed by a secondary processor on the secondary device in conjunction with or independently of the game controller on the EGM 2. In another embodiment, all or a portion of the control of the power interfaces and/or wireless can be implemented in a "service window" type architecture (see FIG. 4 for more details).

In particular embodiments, the EGM 2 can be configured to provide indicators of a status of a power and/or data interface. For instance, in one embodiment, when a power and/or data interface is active, an icon indicating a status of the interface can be displayed on the EGM 2. For example, a lightning bolt 36 is shown on display 26 to indicate that power is actively being supplied to one of the power interfaces. Similarly, another icon can be displayed to represent an active communication session via a communication interface, such as a communication interface involving a wired or wireless connection between the EGM 2 and a portable electronic device.

In other embodiments, an interface, such as 30, 32 and 34, can be surrounded by lighted bezel, partially surrounded by a lighted bezel or include an indicator light near the interface. The lighted bezel can be configured to change color, emit a particular lighting pattern or combinations, such as flashing or steady, to indicate that the power interface is delivering power. For instance, a bezel or indicator can be lighted with a green color when power is being delivered to the interface and a red color when power is cut-off to the interface. In another example, a status light can be turned on when power is being delivered via the interface and turned off when power is not being supplied. Similar, status indicators can be used for communication interfaces to indicate an active or non-active communication session. For instance, the lighted bezel and/or audio feedback can be used to indicate proper device pairing, secure communications and/or recognition and successful establishment of communications.

Other types of feedback mechanisms can be utilized to indicate a status of an interface. For instance, audio devices can be used to provide audio feedback and/or vibration generating devices, which can also produce an audible buzz, can be used to provide feedback. These feedback mechanisms can be used alone or in combination with other feedback mechanisms, such as a light generating mechanism, to indicate the status of various processes implemented on the EGM 2.

In particular embodiments, the EGM 2 can be configured to detect the presence of a portable electronic device and/or user and encourage the user to retrieve their portable electronic device at the end of a game play session. For instance, the EGM 2 can include a camera, such as 40, with a field of view including the player input panel 28. Using image recognition software, the game controller can be configured to recognize an object, such as but not limited to a portable electronic device, left on the input panel 28. Image data received from a camera may also be used to recognize the presence of a user at the EGM 2 and possibly for eye tracking purposes. In one embodiment, a camera can be placed with a field of view of base of the EGM 2, such as the floor area beneath input panel 28. Image data from this camera can be used to recognize objects left on the floor of the EGM 2 near its base, such as a portable electronic or wallet that has fell onto the floor or a purse/bag left at the EGM 2. As described above, the presence of a portable electronic device can also be determined via signal strength and/or triangulation.

When a portable electronic device is detected near the EGM 2, the game controller can be configured, after certain game events, to notify a player to retrieve and/or disconnect their device from the EGM 2. For instance, after a cashout command is received by the game controller, the gaming controller can be configured to display a message 38, such as "Don't forget your device." As another example, the EGM 2 can be configured to emit a sound effect, such as a beeping to get the user's attention in regards to retrieving a device. In yet another example, the EGM 2 configured to flash lights in a distinctive pattern to get the user's attention.

EGM-Mobile Device-User Interactions

In this section, examples of interactions involving an EGM, a mobile device and a user are discussed in more detail with respect to FIG. 1. For example, user interactions with EGM 2 that can lead to a communication connection between the EGM 2 and mobile devices, such as 14 and 16, are described. Further, connection schemes that can be utilized between the mobile device and the EGM 2 are discussed. In addition, applications, such as player tracking or electronic fund transfers that can involve a mobile device are discussed.

A user 8 with a mobile device, such as 14 and 16, can approach EGM 2 to play a wager-based game. The EGM 2 includes an upper video display 25 and lower video display 26 disposed in a secure cabinet 5 with locking mechanisms. The lower video display 26 can be used to display video images associated with the play of a wager-based game, such as a game outcome presentation. The upper video display 25 can be used to display attract features and a bonus game outcome presentation that is triggered from the play of the wager-based game on the lower video display 26. One or both of the upper video display 25 and lower video display 26 can include touch screens. In one embodiment, a portion of the video display screens can be allocated for control a remote device, such as server 4. This embodiment can be referred to as a service window and is described in more detail below with respect to FIG. 4.

To start game play, credits are first deposited on the EGM 2 that can be used for wagers. For instance, currency or a ticket voucher redeemable for credits can be inserted in bill acceptor 35. The ticket voucher can be validated by a remote server in the gaming system, such as 4. As another example, information can be transferred from the mobile devices, 14 or 16, to the EGM 2. The EGM 2 can include wireless and/or wired interfaces that enable communications between the EGM 2 and the mobile devices to be established.

The mobile devices, such as 14 or 16, can be configured as an electronic wallet and the information transfer can be used to initiate an electronic funds transfer that results in credits being deposited on the EGM 2. The use of the mobile device in for these transactions can alert the EGM 2 to the presence of the mobile device. In response to the use mobile device for these purposes, the EGM 2 may attempt to initiate communications with the mobile device that allow it to use the mobile device's wide area network access capabilities.

Whether credits are deposited via a tangible medium, such as a ticket voucher or paper currency, or electronically, such as via the mobile device, the user is likely to be near the front of the EGM 2. Thus, if they are carrying a mobile device, it is likely to be in the general area of the EGM 2. For example, the mobile device is likely to be at least an arm's length distance from the EGM 2. Thus, the EGM 2 can establish a connection with the mobile device 14 or 16 that can be used to facilitate a connection with a remote device via wide area networking capabilities provided by the mobile device 14 or 16.

After depositing credits, a player can make a wager and initiate a game on the EGM 2. The input panel 28 can be used to make selections related to the play of the game, such as a wager amount, and initiate the game. After the game is initiated, a game outcome presentation can be generated on EGM 2. It can include video images output to the displays and accompanying sound effects. For example, during a video slot game played on EGM 2, the game controller can generate a game presentation including a series of video images that show at different times an amount wagered on the game, symbols moving and then stopping in a final position and an award amount associated with game based upon the amount wagered and the final position of the symbols.

In some instances, after depositing credits, typically before beginning game play, a player can initiate a player tracking session on the EGM 2. During a player tracking session, information associated with game play, such as amounts wagered and amounts won can be stored to a player tracking account. This information is often referred to as player tracking information. To encourage repeat business, gaming enterprises often provide complimentary awards ("comps"), such as free meals and lodging, to players. The value of the comp can depend on the value of the player to the casino based upon their player tracking information, such as amounts wagered over time.

The player tracking account can be associated with the user that has initiated game play on EGM 2 and can be hosted on a remote device, such as server. The player can initiate a player tracking session by providing player tracking account information that allows their player tracking account to be located on a device that hosts player tracking accounts. In one embodiment, the player tracking account information can be stored on the mobile devices, 14 or 16, and transmitted to the EGM via a compatible communication interface. In another embodiment, the player tracking account information can be stored on a card that can be read by card reader 15. In yet another embodiment, a service window application can be used to enter player tracking account information.

In other embodiments, the EGM 2 can be configured to detect nearby mobile devices for the purposes of initiated an attract feature that encourages the player to engage in game play at the EGM 2. Thus, the EGM 2 can be aware of nearby mobile devices associated with users not using the EGM 2. These mobile devices may be associated with patrons walking near the EGM 2, standing near the EGM 2 or playing a game on a nearby gaming machine. The ability to detect or be made aware of nearby mobile devices can be provided independently of whether attract features are provided.

In general, when a nearby mobile device is detected or the EGM 2 is made aware of a nearby mobile device (e.g., another device may detect the presence of the mobile device and transmit the information to the EGM), the EGM 2 may attempt to establish communications with the device. In one embodiment, the EGM 2 can be configured to contact and attempt to access the wide area network capabilities of a mobile device. For instance, the EGM 2 can be configured to contact a mobile device associated with a player utilizing the EGM 2 use the wide area network capabilities of the mobile device to communicate with a remote device, such as a remote server.

During game play, the EGM 2 can be configured to send information to the mobile devices, such as 14 or 16, that is for a player's personal use. For instance, the EGM 2 can be configured to send a copy of a screen displayed on 25 or 26 showing the outcome of the game or a bonus game. The player can save this screen copy as a keepsake and may optionally upload it to a social media site. Further, the EGM 2 can be configured to receive information from the mobile device that affects the game play. For instance, the EGM 2 can be configured to receive player tracking information, voucher information and/or player preference information that allows the gaming experience to be customized for a particular player. Thus, the EGM 2 can be configured to interact with a mobile device to send data intended for storage on the mobile device as well as to send data to the mobile device that is intended for a remote device.

The EGM 2 can be configured to detect mobile devices carried by employees of the gaming operator that move throughout the casino floor. In one embodiment, the EGM 2 can be configured to contact these devices for the purposes of utilizing their network access capabilities. These devices can transmit information that allows them to be identified by the EGM 2. In one embodiment, the EGM 2 can be configured to only utilize specially designated devices, such as devices carried by operator employees for the purposes of accessing and engaging in communications with devices on a wide area network, such as the Internet. In yet another embodiment, which is described in more detail below, user devices can be required to have a particular application installed, such as an application provided by the gaming operator, before the mobile devices can be utilized for accessing a wide area network.

In yet another embodiment, a wireless or wired interface can be located within the EGM cabinet that can be used to communicate with a mobile device. The EGM 2 can be configured such that the wireless or wired interface is only activated when the interior of the EGM 2 has been accessed in an authorized manner. The EGM 2 may be configured to only permit communications via this interface when the EGM 2 is an operator mode, such as when the cabinet has been opened via an approved procedure. At other times, the EGM 2 may not be configured to communicate with remote device via a wide area network.

Communications Topologies in a Gaming System Including Mobile Devices

In this section, different communication topologies involving mobile devices in a gaming system are described with respect to FIG. 1. In one embodiment, mobile devices, such as 14 or 16, can communicate directly with the EGM. For example, as described above, the communications can be through a wired or wireless interface available on the EGM. Via an EGM to mobile device communication interface, the mobile device may be able to communicate with the game controller on the EGM, a secondary controller on the EGM, a remote device, such as server 4 or combinations thereof. Examples of a secondary controller include but are not limited to a player tracking controller, a card reader controller, a bill validator controller or a printer controller. In the case of the remote device, such as server 4, the EGM 2 can act as an intermediary in the communications.

In one embodiment, for security purposes, the EGM 2 can be configured to not allow direct communications between the game controller and the mobile device. For example, the mobile device may communicate with a secondary controller in a secondary device coupled to the EGM, such as a card reader controller in a card reader. The secondary controller may include a communication interface that allows it to communicate with a remote device, such as server 4. In a particular embodiment, the communications between the secondary controller and the game controller can be well defined to limit the type of information that is transferred the secondary controller and the game controller. Depending on how the communications are defined, the EGM 2 may be able to receive limited types of information or not any information from the mobile device via the secondary controller.

In another embodiment, the communications between the mobile device and the EGM 2 can be uni-directional. For example, the EGM can be configured to directly send information to the mobile devices, such as 10 or 16, but not directly receive information from the mobile device. In one embodiment, information can be sent from a mobile device to an EGM 2 via an intermediary device, such as server 4 or a secondary device, such as card reader 15. The intermediary device can be configured to screen and limit the information from the mobile device that can be received by the EGM 2.

In yet other embodiments, the EGM 2 and the mobile devices may only communicate indirectly using the communication capabilities associated with a mobile device. For example, mobile devices may be able to establish communication connection with server 4 which then acts as intermediary for communications between the mobile devices, such as 14 and 16, and EGM 2. The EGM 2 can be configured to output information via a display device or some other mechanism that enables the indirect mobile device to EGM communications via an intermediary device, such as server 4, via a local area network, such as 6, or via a wide area network, such as 52. For example, the EGM can be configured to output a QR code that a mobile device can scan. Information embedded in the QR code can allow the mobile device to establish communications with the EGM 2 via server 4, local area network 6 or wide area network 52.

The mobile devices can communicate with a device, such as server 4, using one of its inherent communication capabilities. The mode of communication that is used can vary depending on the communication networks 50 that are available to the mobile devices. For example, the server 4 and EGM 2 can be located on a local area network, such as a local area network 6 within a casino. The local area network can be a private network only accessible from the casino and its vicinity. Via wireless access point 54, the mobile device can access the local area network, such as 6 to access the server 4 or optionally EGM 2. Thus, via wireless access point 54, the mobile device may be able to communicate with 1) a server 4, 2) an EGM 2 where the server 4 acts as intermediary in the communications or 3) directly with the EGM 2 via the local area network 6.

In other embodiments, the server 4 and/or the EGM 2 can access a wide area network, such as the Internet 52 and have an Internet address. Via the wireless access point 54 or a cellular data connection 56, the mobile device, such as 14 or 16, can access the Internet 52 to establish communications with server 4 or EGM 2. Again, the server 4 can act as intermediary in the communications between the mobile device and the EGM 2. Thus, the mobile devices can establish communications with server 4 via the Internet 52 and then, the server 4 can establish communications with the EGM 2 using an alternative method.

In various embodiments, different EGMs in a gaming system can be provided with different communication capabilities. Thus, a combination of the communication topologies used above can be used for communications between mobile devices and EGMs in a gaming system. For instance, a mobile device can communicate with a first EGM via a direct wireless connection between the first EGM and the mobile device and then communicate with a second EGM via a wireless access point that connects to a local area network on which the second EGM is located.

Information Related to Mobile Device Interactions within a Gaming System

In this section, details of providing player mobile device related information, such as feedback information related to the connection state between a mobile device and a gaming system, are described. As discussed above, a mobile device can be used within a gaming system to generate many different types of services and transactions. The services or transactions may require the mobile device to be used in particular manner and then may require some sort of interface to be maintained between the mobile device and a device in a gaming system, such an EGM and or a server. When a transaction or service in the gaming system is implemented using a mobile device, the mobile device related information can be used to inform a user how to utilize their mobile device and then inform the user whether the mobile device has been used correctly. The mobile device related information can be provided in many different formats using various combinations of output devices on the EGM. A few examples of information formatting and device configurations that can be used to provide mobile device information are described as follows with respect to FIG. 2.

Figure 2:
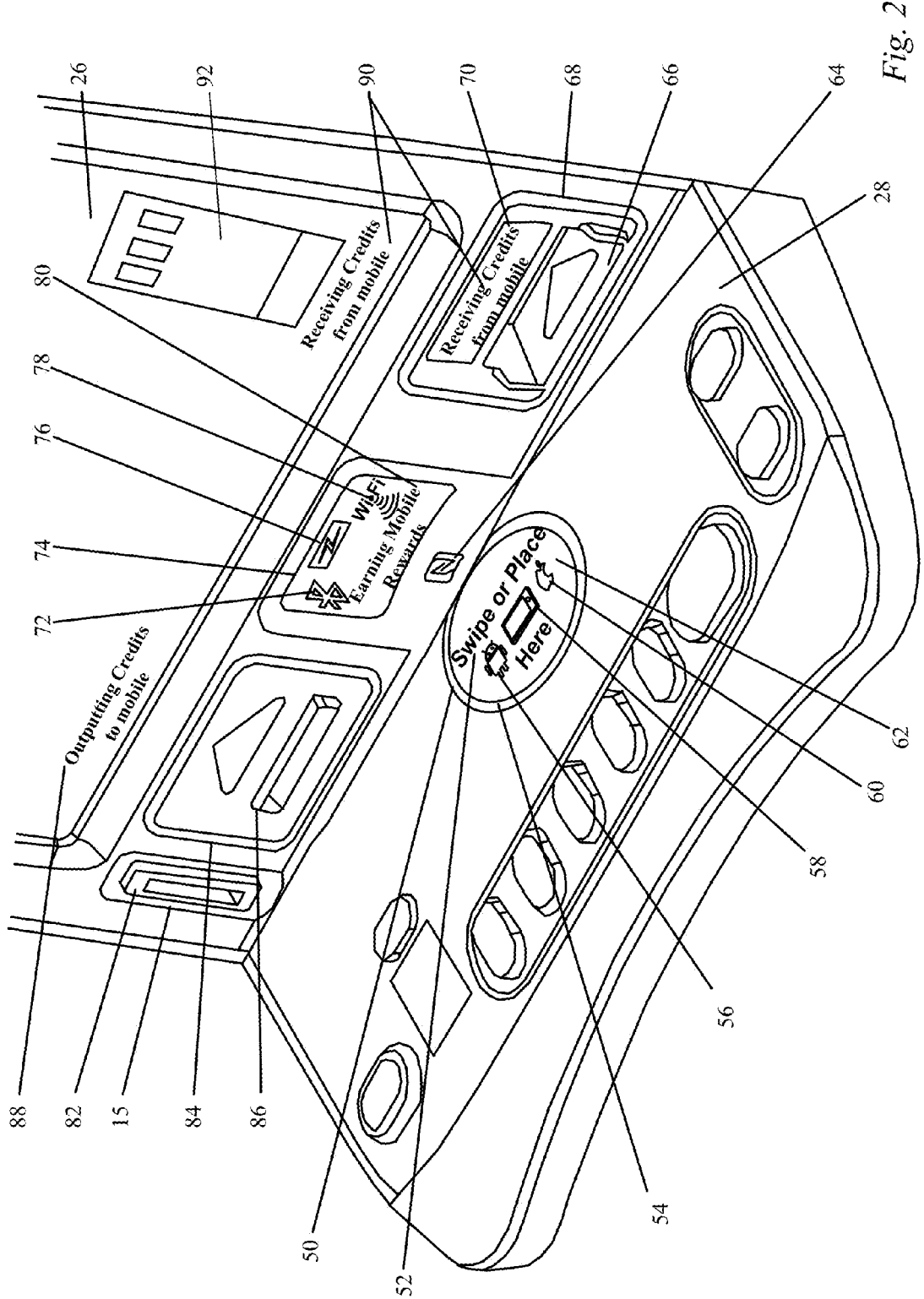
FIG. 2 shows a perspective drawing of a portion of an EGM including a landing area for a mobile device in accordance with the described embodiments.

FIG. 2 shows a perspective drawing of a portion of an EGM 2 including a landing area 50 where a mobile device can be placed or utilized. The landing area is located on an upper surface of the player input panel 28. In one embodiment, a mobile device may be placed in the landing area 50 and may have to remain in the landing area 50 to enable a service. For example, a mobile device may have to remain in the landing area 50 to receive a wireless transmission of power from the EGM. In another example, the reception range of a wireless interface can be made small enough such that the mobile device has to remain in or near the landing area 50 to establish and maintain an active wireless communication session.

In other embodiments, the mobile device may have to be passed or moved through a space proximate to the landing area 50 to enable a transaction. For example, a secure wireless pairing, such as a Bluetooth™ communication, can be initialized between a mobile device and the EGM when a user taps or swipes their mobile device on the landing area 50. In another example, the user can tap or swipe their mobile device in the landing area 50 to transfer their player tracking information to the EGM and initiate a player tracking session. In yet another example, the user can tap or swipe their mobile device in the landing area 50 to initiate a transfer of credits from the mobile device to the gaming system or from the gaming system to the mobile device. In a further example, an EGM operator can swipe or tab a mobile device in the landing area 50 to read metering information from the EGM.

The landing area 50 can be marked in a number of different manners to notify a user of its presence and its capabilities. For example, in one embodiment, the proximate boundaries of the landing area 50 can be denoted by paint, decals or other markings on the surface of the player input panel 28. The markings can be used to communicate information to the player related to the use of the landing area. For example, the message 52 "swipe or place here" is included in the landing area 50. The message 52 is arranged above or below an image of a mobile phone 58. Thus, the message 50, in combination with the image of the mobile device 52, communicates some information about how the user can use their mobile device at the EGM.

The EGM and the gaming system may not be compatible with every type of mobile device. Thus, in some embodiments, information can be placed in or near the landing area to indicate certain types of devices with which the gaming system can interact. For example, an Android™ logo 56 and an Apple™ logo are placed in the landing area 50. The Android™ 56 and Apple™ logos can be used to indicate the gaming system is capable of interacting with mobile devices using the Android operating system by Google™ or the iOS operating by Apple™. If the gaming system is capable with mobile device executing a Windows operation system by Microsoft™, then a logo for windows can be provided. A NFC logo 64 is placed on a surface approximately perpendicular to the landing area 50. The NFC logo 64 can be used to indicate an NFC compatible wireless interface is available in the area near the landing area 50.

System compatibility information can be communicated in other formats besides a logo. For instance, a message in a text format can be used to communicate system compatibility information. An example of such a message can be "the gaming system is compatible with devices executing the Android™, iOS™ and Windows™ operating systems.

The surface of the landing area can be formed or molded to emphasize information placed in the landing area 50. For example, a cover 62 formed from plastic or some other suitable material can be placed in the landing area. The top of the cover 68 can be formed to be parallel with the surrounding surface of the input panel 28. The mobile device related information, such as logos 56 and 60, mobile device image 58 and message 50 can be formed within the cover 62 with raised or sunken surfaces to provide a three dimensional presentation. For example, the letters of the message "Swipe or Place Here" can be formed as sunken or raised letters in the surface of the plastic cover. Similarly, the Apple logo 60 can be formed with raised or sunken surfaces.

Mobile device information integrated into a surface can be placed at other locations on the EGM. For example, the NFC logo 64 which is used to indicate that the EGM is compatible with an NFC wireless communication protocol can be formed in a three-dimensional shape. Other examples of logos for conveying wireless compatibility information are the Bluetooth™ logo 72 and the Wi-Fi™ logo 78.

In yet other embodiments, mobile device related information can be marked on or integrated into other surfaces on the EGM. For examples, symbols, such as 56, 60, 64, 72 and 78, can be marked on or integrated into 1) a bezel 82 associated with the card reader 15, 2) a bezel 86 and/or the area surround the bezel 86 for a printer 84, 3) a bezel 66 or area surrounding the bezel for a bill or ticket acceptor 68 or 4) combinations thereof. The mobile device related information can also be integrated into or marked on surfaces associated with the EGM cabinet, such as the input panel surface 28 or the surface surrounding the display 26 on the front panel of the EGM. In general, mobile device related can be integrated into any surface of the EGM cabinet visible to a user.

Mobile device related information can be emphasized using various lighting effects. For example, lights can be placed around the perimeter 54 of the landing area 50 to draw attention to the landing area 50. In another example, the cover 62 can be backlit to emphasize the landing area 50. The lighting effects can also be used to communicate mobile device related information. For example, when an active communication session is established between a mobile device and the gaming system, the light ring 54 can be commanded to emit a colored light, such as green colored light. If the communication connection is lost, then the light ring 54 can be commanded to emit a colored light, such as a red colored light. Lights located under cover 62 can be arranged and commanded to perform a similar function.

In the previous paragraph, the active communication session doesn't necessarily have to be performed through the EGM and the active communication session may not even be with the EGM. For example, lighting effects can be used to indicate whether a communication session is currently active between the mobile device and a server in the gaming system. The mobile device to server communications can be performed via a wireless interface located away from the EGM, such as a wireless interface located in the ceiling of a casino in which the EGM is located, or via a wireless interface associated located on the EGM.

Lighting effects on the EGM can be used to convey a state of a communication session between the mobile device and the server. The server can monitor the status of the communication session and then send commands directly to devices on the EGM, such as lights in the landing area 50, to reflect the current status of the communication sessions. The state of devices, such as lights on the EGM, can be changed in response to receiving the commands from the server.

In another embodiment, a server can send mobile device information related to a state of communication session between the mobile device and the server to a game controller or a secondary controller on the EGM. The secondary controller can be located on a device in communication with the game controller, such as a player tracking unit, a card reader, a printer or a bill/ticket validator. In response to receiving the commands, the game controller or the second controller can control output devices, such as lights associated in the landing area 50, to convey the information. For example, the server can indicate to the game controller that it is actively communicating with the mobile device and in response the game controller can control output devices, such as lights and/or audio output devices associated with the landing area, to convey the received mobile device information (e.g., a status of the communication session). In this example, the received mobile device information indicates the mobile device is actively communicating with a server within the gaming system.

The mobile device can also establish a communication session and/or actively communicate with a game controller or a secondary controller. The communication session can be in lieu of or in conjunction with the communication session with the server. For example, the mobile device can establish a communication session with a server and then establish a communication session with a secondary controller. The communication sessions with the server and the secondary controller can be active at the same time. Mobile device information related to the status of each of the two communication sessions can be output on the EGM.

When a communications session is established with the game controller or the secondary controller, the controllers can operate a wireless communication interface to enable the communication session. The controller can determine a state of the communication session between the mobile device and the controller and then control output devices to reflect the state of the communication session. In one embodiment, a first controller on the gaming machine can monitor the state of the communication session and then send information about the state to a secondary controller which then controls the output devices to reflect the state of the communication session. For example, the game controller can determine that a connection with a mobile device has been lost and then send the information to a secondary controller on a card reader. The second controller can control devices, such as a display, lights and/or audio devices to provide feedback information to a user that the connection state has changed and the current state of the connection state. As described above, in one embodiment, lights on a bezel surrounding an input or output slot on the EGM, such as lights integrated into a card reader bezel, can be controlled to convey the mobile device related information.

A displays or displays can be used to provide mobile device related information to a user of the EGM, such as connection state information, transaction state information and/or service related information. In FIG. 2, three displays are shown that can be used to convey mobile device related information. A first display 74 is located near the landing area 50. A second display 70 is located above the bill/ticket validator slot. In one embodiment, the second display 70 is controlled by the bill validator controller and is provided as a peripheral device coupled to the bill validator assembly. In another embodiment, the second display is controlled by another controller, such as the game controller. A third display 26 that can be used to display the outcome to a wager-based game as well as mobile device related information. In one embodiment (not shown), a display can be integrated into the landing area 50.

A Bluetooth™ symbol 72, a charging symbol 76, Wi-Fi symbol 78 and a message "Earning Mobile Rewards" 80 are shown output on display 74. The Bluetooth symbol 72 can be used to indicate an active Bluetooth communication has been established between the mobile device and the gaming system. If a Bluetooth communication is lost or has never been established then this symbol may not be output to a display 74. Using a Bluetooth symbol is only one example of how the status of a Bluetooth communication can be indicated. In another example, a message, such as "Bluetooth active" or "BT active" can be output to the display 74 to indicate the Bluetooth status. In general, many different visual formats including text and/or symbols can be used to convey the mobile device related information and the formats shown in FIG. 2 are for the purposes of illustration only. In addition, other communication formats, such as Bluetooth™, Wi-Fi and NFC can be utilized and these examples are provided for the purposes of illustration only.

The charge symbol 76 is used to indicate that a mobile device is actively receiving power from the EGM. In one embodiment, a mobile device (not shown) can receive power when it is placed on the landing area 50 or is coupled to the EGM via an adapter or connector of some type. The Wi-Fi symbol 78 can be used to indicate a Wi-Fi communication session has been established and is active between a mobile device and the gaming system. The Wi-Fi communication session may be established via a wireless access point located near the EGM or via a wireless access point provided on the EGM. In one embodiment, the Wi-Fi communication connection may allow the mobile device to access a local area network and/or a wide area network, such as the Internet.

The "Earning Mobile Rewards" message 80 can be used to indicate that the user is earning rewards as a result of their game play on the EGM. The rewards can be earned as part of a loyalty program to which the player has registered or can be earned separately from a loyalty program. In various embodiments, the initiation of a session where a player earns rewards can be initialized based upon receiving information from the mobile device. For example, a communication session can be established between the gaming system and the mobile device and then player tracking information, such as a player tracking account number, can be sent to the gaming system from the mobile device to allow the player to begin earning rewards. In another example, the gaming system can passively detect information emitted from the mobile device, such as information it broadcasts to establish a communication session, and based upon receiving this information from a mobile device, the gaming system can allow the player to begin earning rewards. The "Earning Mobile Rewards" message 80 can be used to indicate that the user is earning rewards based upon information the gaming system has received from their mobile device.

In alternate embodiments, the symbols and text associated with 72, 76, 78 and 80 can be integrated into a surface, such as raised and/or sunken into the surface was previously described above. The symbols and/or text can be back-lit such that the symbols are illuminated. Mobile device related information can be conveyed by illuminating or not illuminating the symbol and/or the text or by changing a color of the illumination to convey the information. For example, "Earning Mobile Rewards" 80 can be lit when rewards are being earned and unlit when rewards are not being earned or can be lit in green when rewards are being earned and lit in red when rewards are not being earned.

As described above, mobile device related information can be output to other displays, such as 26 and 70. In the example of FIG. 2, an image 92 of the screen of mobile device coupled to the gaming system is output to the EGM. In one embodiment, the image 92 can be output using a service window (see FIGS. 4 and 5 below for more service window details). Using image 92, the player can view the image displayed on their mobile device and compare it to the image displayed on the EGM to confirm that it is their mobile device that is currently coupled to the gaming system. This feature can be useful in the scenario where a player keeps their mobile device on their person, such as in a pocket, while the mobile device is interacting with the gaming system.

In another example, mobile device related information relating to transactions, monetary transactions, performed using the mobile device can be output to a display on the EGM. As an example, rather than printing a voucher that can be redeemed for cash or additional game play, the information can be sent in an electronic format to a mobile device where the electronic voucher can be redeemed for cash or additional game play. The message "Outputting Credits to Mobile" 88 is used to indicate an electronic transaction involving a mobile device is being implemented. If a problem occurs with the transaction, additional information can be output. For example, if a communication problem between the gaming system and the mobile device occurred, then a message such as "mobile communication problem, mobile transaction cancelled" can be displayed.

A similar message is generated for a cash or credit transfer to the EGM. The message 90, "receiving credits from mobile" is output on displays 26 and 70. The message can be used to indicate that a credit or cash transfer between the mobile device and the gaming system is taking place. As described above, the communications to enable the transfer can be through a remote server or via the EGM. If there is a mobile device problem with the transfer, such as a problem involving communications with the mobile device, then a message can be displayed that indicates the nature of the problem and possibly a remedy to the problem, such as "communications lost, swipe or tap your mobile device in landing area to initialize communications."

Figure 3:
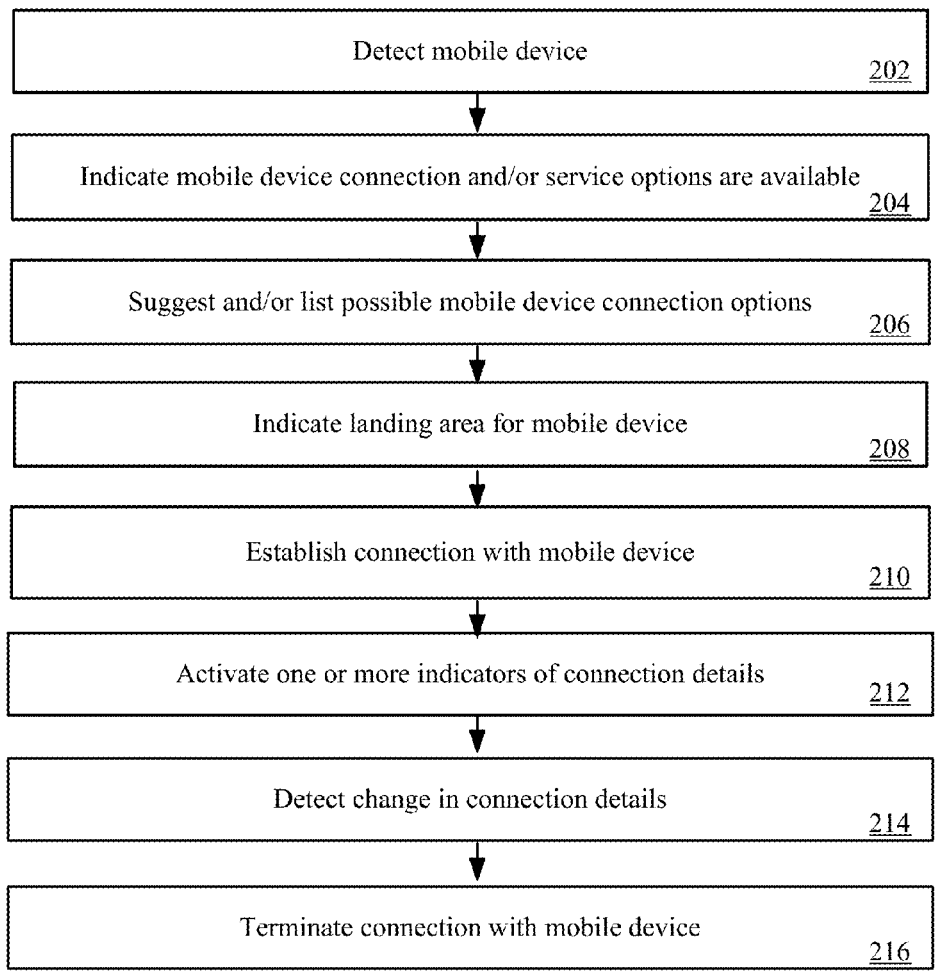
FIG. 3 is a flow chart of a method in a gaming system for providing feedback of a mobile device connection state.

FIG. 3 is a flow chart of a method 200 in a gaming system for providing feedback of a mobile device connection state. In 202, a mobile device can be detected by the gaming system. In one embodiment, the detection may be passive in that the presence of the mobile device is revealed from the wireless information it is broadcast. In another embodiment, the gaming system may assume that a majority of users will have mobile devices. Thus, when a user is detected, such as when a user deposits credits into an EGM, the gaming system can assume that a mobile device is present and act according even if the mobile device hasn't been physically detected.

In 204, the gaming system can indicate connection and/or services involving mobile devices are available. In one embodiment, an EGM can include one or more different mechanisms as described above for conveying this information, such as a sticker or markings to indicate the availability of different wireless connection types and system compatibilities with different devices. In 206, in one embodiment, the gaming system can be configured to determine capabilities of a mobile device that is has detected. In response, it can suggest and/or list possible mobile device connection options. In another embodiment, it may simply select the connection options that are most suitable for the mobile device.

In 208, the gaming system can be configured to indicate a presence of a landing area, if one is available, for a mobile device. For example, a lighting mechanism can be located adjacent to and a landing area. The lighting mechanism can be activated to attract a user's attention to the landing area. In addition or alternatively, a message can be output to the main display of the EGM to notify a user of the presence of a landing area. For example, the message that is displayed might say "Swipe, tap or place your device in the area below to begin mobile device services." An arrow or arrows can be included with the message to direct the player's attention to the desired location.

In 210, a communication connection can be established between the mobile device and the gaming system. For example, a tap of the mobile device on a landing area may have initiated a transfer of information that allows a secure pairing to be established between the mobile device and the gaming system. In 212, one or more indicators related to mobile device information, such as connection details, can be activated. For example, in one embodiment, a symbol or message can be incorporated into a light transmissive material, such as a plastic, where the symbol or message can be back-lit. The symbol or message can be lit-up to provide the mobile device related information. In another embodiment, mobile device related information can be output to a display.

In 214, the gaming system can detect a change in mobile device related information that is it monitoring, such as the connection state between the mobile device and the gaming system. In response, one or more mechanisms used to indicate the mobile device status information can be controlled to reflect the new information. For example, if an indicator light is lit beneath a symbol in a bezel when a connection is made, then a state of the indicator light can be lit when a connection is established and unlit when a connection is terminated.

In 216, the connection with the mobile device can be terminated. Upon termination, mechanisms used to reflect the connection state of the gaming system with a mobile device can be returned to a non-connected state. For example, lights that are lit can be unlit. As another example, a light array around a landing area for a mobile device can be placed in an attract state, such as flashing light pattern, to draw a player's attention to the landing area for the mobile device.

Gaming Devices and Systems

Figure 4:
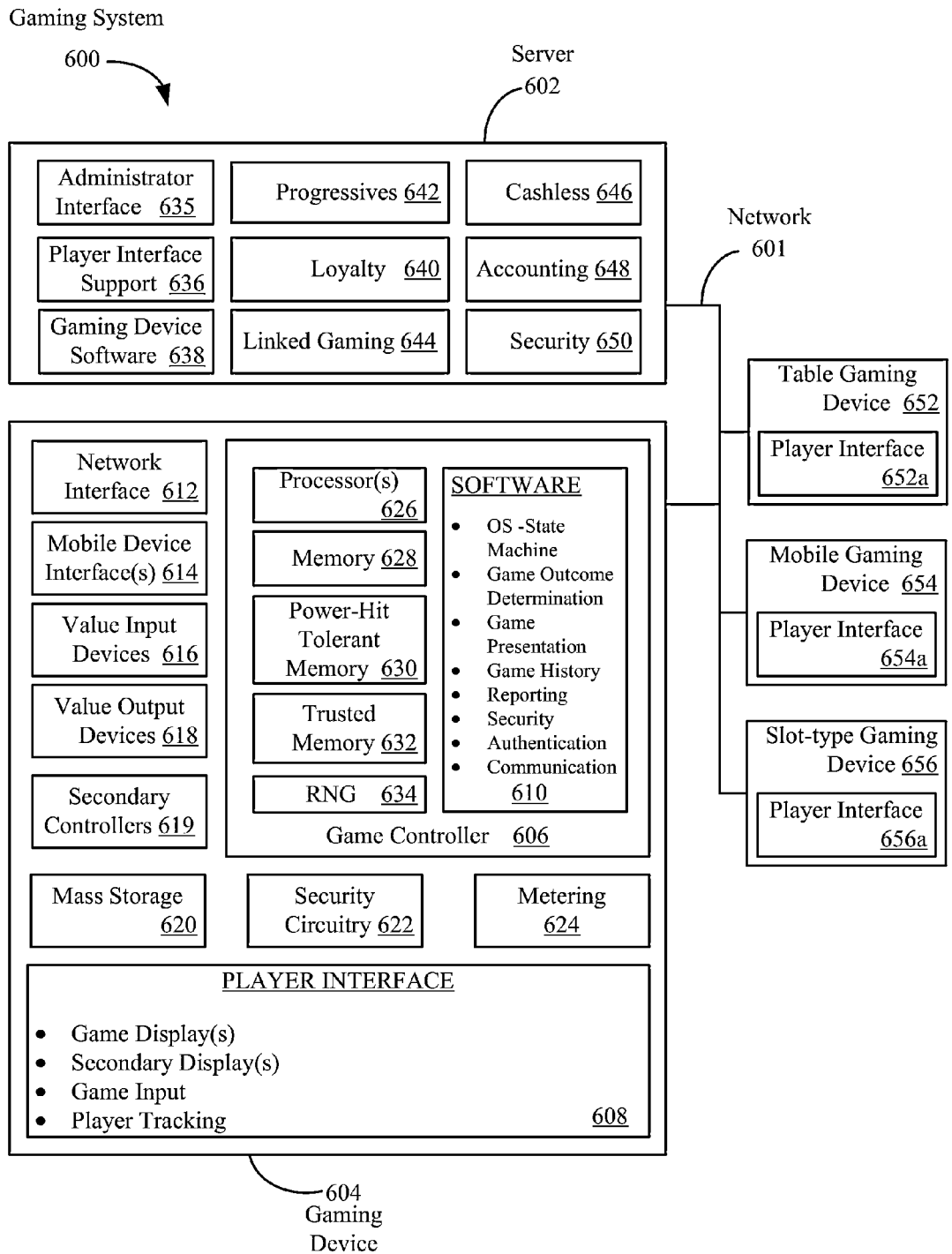
FIG. 4 shows a block diagram of a gaming device in accordance with the described embodiments.
Figure 5:
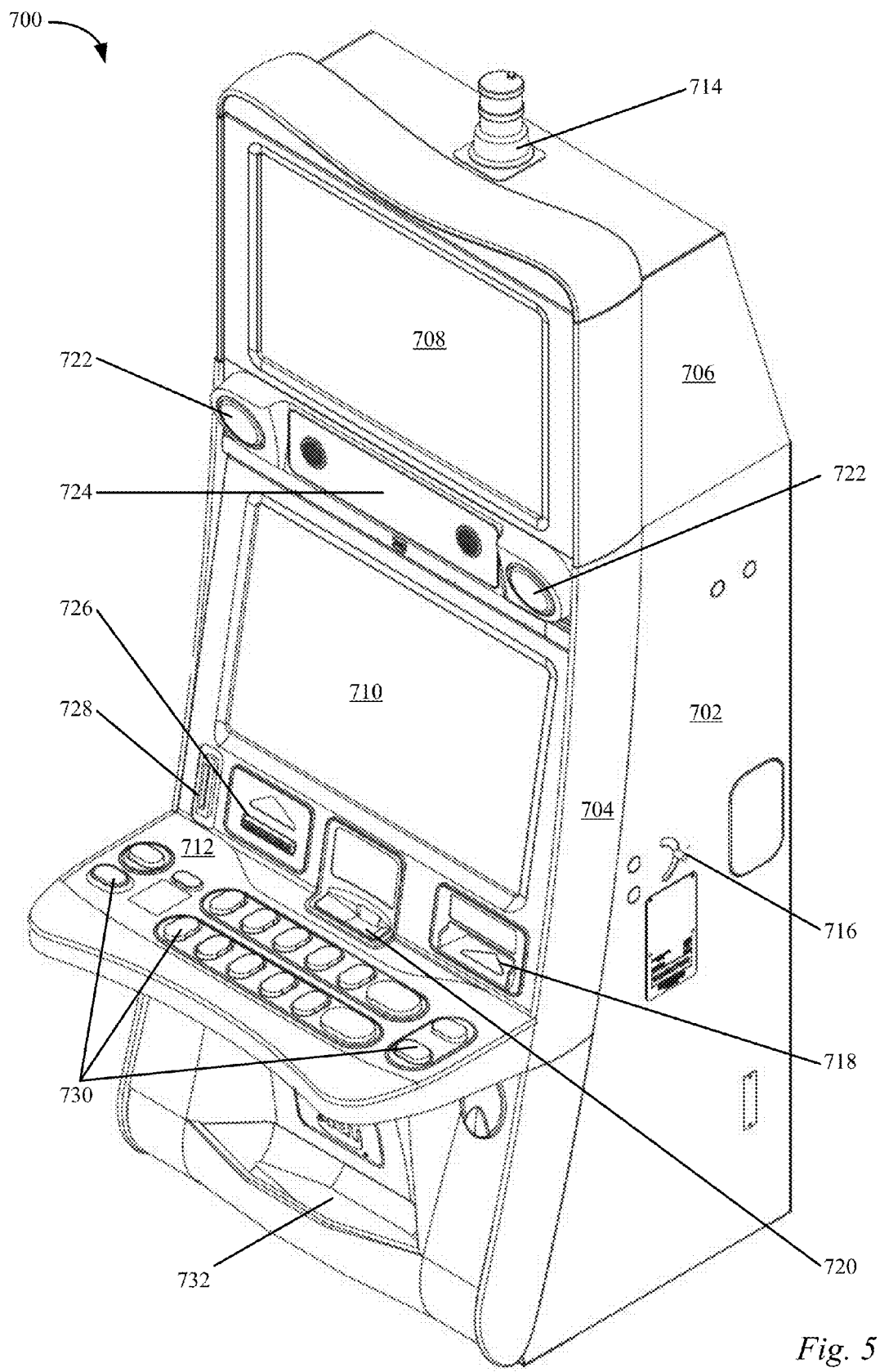
FIG. 5 shows a perspective drawing of a gaming device in accordance with the described embodiments.

Next additional details of EGMs and gaming systems are described with respect to FIGS. 4 and 5. FIG. 4 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652a, 654a and 656a, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652a, 654a and 656a. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a portable electronic device via the communication interface. Thus, a service window application can be configured to implement attract features as described above independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the portable electronic device. For instance, a receipt indicating the acceptance of a virtual ticket voucher or virtual currency on the gaming device can be displayed in the service window in a QR code format and transferred to a user's portable electronic device via an image capture device on their portable electronic device. In another embodiment, virtual ticket voucher information can be transferred to a portable electronic device as optically formatted image data.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can be used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 5 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 4, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 5, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 5 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

Figure 6:
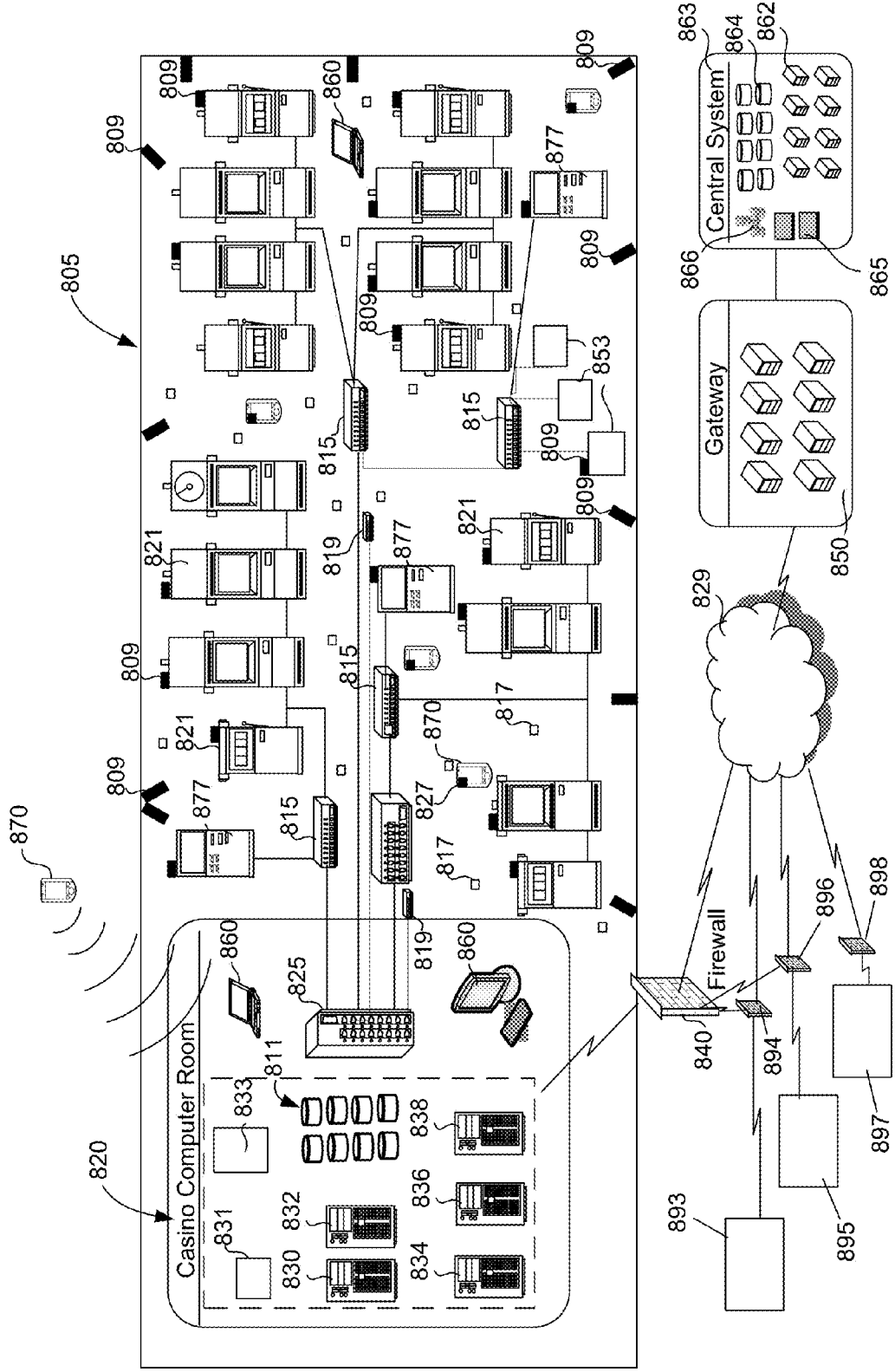
FIG. 6 is a block diagram of a networked gaming system in accordance with the described embodiments.

FIG. 6 shows a server-based (Sb™) gaming network, configured in accordance with some implementations. Those of skill in the art will realize that this architecture and the related functionality are merely examples and that the present disclosure encompasses many other such embodiments and methods. With respect to FIG. 6, casino computer room 820 and networked devices of a gaming establishment 805 are illustrated. Gaming establishment 7805 is configured for communication with central system 863 via gateway 850. Gaming establishments 893 and 895 are also configured for communication with central system 863.

In some implementations, gaming establishments may be configured for communication with one another. In this example, the gaming establishments 893 and 895 are configured for communication with devices within casino computer room 820. Such a configuration may allow devices and/or operators in the casino 805 to communicate with and/or control devices in other casinos. In some such implementations, a server in computer room 820 may control or at least provide information to devices in the casino 805 and devices in other gaming establishments. Conversely, devices and/or operators in another gaming establishment may communicate with and/or control devices in the casino 805.

A server can be configured to provide gaming services to devices, such as EGMs, in one or more gaming establishments. For example, a server of casino 805 or central system 863 may be provisioned with relatively more advanced software (e.g., 3-D facial recognition software) for patron identification than servers of other networked locations. Such a server may process patron identification requests from devices in casino 805 as well as patron identification requests from devices in gaming establishments 893 and 895. As another example, a server in casino 805 can generate and stream content that is output in EGMs located in casino 805 and gaming establishments 893 and 895.

In one embodiment, gaming establishment 897 can be configured for communication with central system 863, but may not be configured for communication with other gaming establishments. Some gaming establishments (not shown) may not be in communication with other gaming establishments or with a central system. Gaming establishment 805 can include many different EGMs, such as 821. The EGMs can be located on a casino floor alone or as part a bank 810 including multiple gaming machines.

In this example, gaming establishment 805 includes a bank of networked gaming tables 853. The networked gaming tables can provide games, such as card games, dice games, roulette and the like. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 853 may be configured for communication with individual player terminals (not shown), which may be configured to accept bets, present an electronic representation of a dealer, indicate game outcomes, etc.

In general, embodiments of the present disclosure may be implemented in gaming establishments having any number of gaming devices, such as EGMs and gaming tables. It will be appreciated that many gaming establishments include hundreds or even thousands of gaming machines and/or gaming tables. The gaming machines can be linked in many different network configurations where some EGMs can be linked to one or more different networks providing different gaming functions while some EGMs may not be connected to a network.

Gaming establishment 805 also includes networked kiosks 877. Depending on the implementation, kiosks 877 may be used for various purposes, including but not limited to cashing out, prize redemption, redeeming points from a player loyalty program, redeeming "cashless" indicia such as bonus tickets, smart cards, etc. In some implementations, kiosks 877 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present disclosure. For example, in some implementations of the disclosure, kiosks 877 may be configured to receive information from a patron, e.g., by presenting graphical user interfaces.

In this example, each bank 810 has a corresponding switch 815, which may be a conventional bank switch in some implementations. Each switch 815 can be configured for communication with one or more devices in computer room 820 via main network device 825, which combines switching and routing functionality in this example. Although various communication protocols may be used, some preferred implementations use the Gaming Standards Association's G2S Message Protocol. Other implementations may use the open, Ethernet-based SuperSAS® protocol, which is available from IGT. Still other protocols, including but not limited to Best of Breed ("BOB"), may be used to implement various embodiments of the disclosure. IGT has also developed a gaming-industry-specific transport layer called CASH that rides on top of TCP/IP and offers additional functionality and security.

In one embodiment, the gaming establishment 805 also can include a wireless network, such as an RFID network, implemented in part by RFID switches 819 and multiple RFID readers 817. An RFID network may be used, for example, to track objects (such as mobile gaming devices 870, which include RFID tags 827 in this example). In addition, patrons, etc., in the vicinity of gaming establishment 805 can carry instruments with RFID tags that allow the patrons to be tracked. In this example, at least some of mobile devices 870 may include an RFID tag 827, which includes encoded identification information for the mobile device 870. Accordingly, the locations of such tagged mobile devices 870 may be tracked via the RFID network in gaming establishment 805. The mobile devices can be carried by casino patrons and/or casino employees.

Other location-detection devices and systems may be used to monitor the location of people and/or devices in the vicinity of gaming establishment 805 or elsewhere. For example, wireless signal detectors can be used to track wireless signals emitted from mobile devices, such as signals generated using a cellular, Wi-Fi or Bluetooth™ communication protocol. The wireless signal detectors can be used to track the mobile devices and/or the patrons carrying the mobile devices. The wireless signal detectors can be incorporated into gaming devices, such as kiosks or EGMs, but can also separate from these devices. In various embodiments, a gaming establishment may not include any type of system for detecting wirelessly detecting devices, may include a single system, such as an RFID system or mobile device detection system or may include multiple wireless detection systems. In some embodiments, the wireless signal detectors can be a component of a wireless communication system implemented within the gaming establishment 805.

Various alternative network topologies can be used to implement different embodiments of the disclosure and/or to accommodate varying numbers of networked devices. For example, gaming establishments with large numbers of gaming machines may require multiple instances of some network devices (e.g., of main network device 825, which combines switching and routing functionality in this example) and/or the inclusion of other network devices not shown in FIG. 6. Some implementations of the disclosure may include one or more middleware servers disposed between kiosks 877, data switches 819 and/or bank switches 815 and one or more devices in computer room 820 (e.g., a corresponding server). Such middleware servers can provide various useful functions, including but not limited to the filtering and/or aggregation of data received from switches, from individual gaming machines and from other devices. Some implementations of the disclosure include load-balancing methods and devices for managing network traffic.

Storage devices 811, Sb™ server 830, License Manager 831, Arbiter 833, servers 832, 834, 836 and 838, host device(s) 860 and main network device 825 can be disposed within computer room 820 of gaming establishment 805. In practice, more or fewer devices may be used. Depending on the implementation, some such devices may reside in gaming establishment 805 or elsewhere.

One or more devices in central system 863 may also be configured to perform, at least in part, tasks specific to the present disclosure. For example, one or more servers 862, arbiter 833, storage devices 864 and/or host devices 866 of central system 863 may be configured to implement the functions described in detail elsewhere herein. These functions may include, but are not limited to, providing functionality for devices such as wager gaming machines 821, mobile devices 870, etc.

One or more of the servers of computer room 820 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras 809, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of computer room 820 to mobile devices 870. Some implementations of the present disclosure include a plurality of networked cameras 809, which may be video cameras, smart cameras, digital still cameras, etc. In some such implementations, such cameras may provide, at least in part, real-time navigation.

The servers and other devices indicated in FIG. 6 may be configured for communication with other devices in or outside of gaming establishment 805, such as host devices 860, kiosks 877 and/or mobile devices 870, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the disclosure provide one or more of these servers in the form of blade servers.

Some embodiments of Sb™ server 830 and the other servers shown in FIG. 8 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations, many of these devices (including but not limited to License Manager 831, servers 832, 834, 836, and 838, and main network device 825) are mounted in a single rack with Sb™ server 830. Accordingly, many or all such devices will sometimes be referenced in the aggregate as a "Sb™ server." However, in alternative implementations, one or more of these devices is in communication with Sb™ server 830 and/or other devices of the network but located elsewhere. For example, some of the devices could be mounted in separate racks within computer room 820 or located elsewhere on the network. Moreover, it can be advantageous to store large volumes of data elsewhere via a storage area network ("SAN").

Computer room 820 may include one or more operator consoles or other host devices that are configured for communication with other devices within and outside of computer room 820. Such host devices may be provided with software, hardware and/or firmware for implementing various embodiments of the disclosure. However, such host devices need not be located within computer room 820. Wired host devices 860 (which are desktop and laptop computers in this example) and wireless devices 870 (which are mobile computing devices in this example) may be located elsewhere in gaming establishment 805 or at a remote location.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A wager-based electronic gaming machine (EGM) configured to output mobile device related information, the EGM comprising:
   a cabinet;
   a game controller, disposed within the cabinet, configured to control a wager-based game played on the EGM;
   a value input device for accepting cash or credits used for wagers on the wager-based game;
   a value output device for dispensing at least credits redeemable for cash;
   a player input panel communicatively coupled to the game controller configured to receive inputs associated with the wager-based game;
   a main display communicatively coupled to the EGM configured to show an outcome to a wager-based game;
   a secondary display for outputting information to a player of the EGM relating to a mobile device, wherein the mobile device has a mobile device display;
   a secondary controller configured to communicate with the mobile device and the game controller, such that the mobile device communicates with the game controller via the secondary controller; and
   a mobile device related indicator integrated into a surface of the EGM at a location visible to the player for conveying mobile device related information to the player of the EGM, wherein at least one of a symbol and text associated with the mobile device related indicator is integrated into the surface such that at least one of the symbol and the text are visible when a lighting mechanism located underneath the surface is activated, and
   wherein communication between the mobile device and the game controller includes the game controller being configured to directly send information to the mobile device while the secondary controller is configured to screen information from the mobile device to the game controller.

2. The EGM of claim 1, wherein the mobile device related indicator is used to convey whether a mobile device is actively communicating with a gaming device in a game system.

3. The EGM of claim 2, wherein the gaming device is a remote server communicatively coupled to the EGM.

4. The EGM of claim 3, wherein the EGM is configured to receive information from the remote server regarding whether the mobile device is actively communicating with the gaming system and in response, control the mobile device related indicator to indicate whether the mobile device is actively communicating with the gaming system.

5. The EGM of claim 2, wherein the lighting mechanism is turned on when the mobile device is actively communicating with the gaming device and turned off when the mobile device is not actively communicating with the gaming device.

6. The EGM of claim 2, wherein the lighting mechanism is controlled to emit a first color when the mobile device is actively communicating with the gaming device and is controlled to emit a second color when the mobile device is not actively communicating with the gaming device.

7. The EGM of claim 1, wherein at least one of the symbol and the text are raised from the surface or lowered from the surface to give the at least one of the symbol and text a three-dimensional appearance.

8. The EGM of claim 1, wherein the mobile device indicator is located on or adjacent to a bezel surrounding a card reader input slot on the EGM and wherein the lighting mechanism is controlled by the card reader controller.

9. The EGM of claim 1, wherein the mobile device indicator is located on or adjacent to a bezel surrounding a ticket output slot on the EGM.

10. The EGM of claim 1, wherein the mobile device indicator is located on or adjacent to a bezel surrounding a bill or ticket input slot on the EGM.

11. The EGM of claim 1, further comprising a plurality of mobile device indicators each including a lighting mechanism wherein a state of the lighting mechanism is independently controllable to indicate mobile device related information.

12. The EGM of claim 1, wherein the mobile device indicator is used to provide feedback information related to a type of wireless interface that is being utilized to enable communications between the mobile device and the gaming system and a current connection state associated with the type of wireless interface.

13. The EGM of claim 1, wherein the mobile device indicator is used to indicate whether the EGM is outputting power that can be used to charge the mobile device at the EGM.

14. The EGM of claim 1, further comprising one or more markings for conveying information related to a compatibility of the gaming system with one or more different mobile device types.

15. The EGM of claim 14, wherein the compatibility is related to an operating system utilized by the mobile device.

16. The EGM of claim 1, wherein the information relating to the mobile device is related to a transaction being performed that involves the mobile device.

17. The EGM of claim 1, further comprising a landing area configured to receive the mobile device.

18. The EGM of claim 17, wherein a wireless interface located beneath or adjacent to the landing area wherein a transfer of data is enabled between the mobile device and the gaming system when the mobile device is placed in the landing area, when a portion of the mobile device is used to make contact with the landing area or when the mobile device is briefly positioned near the landing area without physical contact between the landing area and the mobile device.

19. The EGM of claim 17, further comprising a lighting mechanism located adjacent to the landing area wherein the lighting mechanism is controlled to draw attention to the landing area.

20. The EGM of claim 17, further a lighting mechanism located beneath the landing area, the landing area being light transmissive to allow the landing area to be lit up when the lighting mechanism is activated.

21. The EGM of claim 1, wherein the main display is a video display or a mechanical display including one or more reels.

22. A wager-based electronic gaming machine (EGM) configured to output mobile device related information, the EGM comprising:
a cabinet;
a game controller, disposed within the cabinet, configured to control a wager-based game played on the EGM;
a value input device for accepting cash or credits used for wagers on the wager-based game;
a value output device for dispensing at least credits redeemable for cash;
a player input panel communicatively coupled to the game controller configured to receive inputs associated with the wager-based game;
a main display communicatively coupled to the EGM configured to show an outcome to a wager-based game;
a secondary display for outputting information to a player of the EGM relating to a mobile device, wherein the mobile device has a mobile device display;
a secondary controller configured to communicate with the mobile device and the game controller, such that the mobile device communicates with the game controller via the secondary controller; and
a plurality of mobile device related indicators, integrated into a surface on the EGM at a location visible to the player, for conveying mobile device related information to the player of the EGM, wherein at least one of a symbol and text is associated with each of the mobile device related indicators and a lighting mechanism is associated with each of the mobile device related indicators such that at least one of the symbol and the text are visible when the lighting mechanism is activated, and
wherein communication between the mobile device and the game controller includes the game controller being configured to directly send information to the mobile device while the secondary controller is configured to screen information from the mobile device to the game controller.

23. A wager-based electronic gaming machine (EGM) configured to output mobile device related information, the EGM comprising:
a cabinet;
a game controller, disposed within the cabinet, configured to control a wager-based game played on the EGM;
a value input device for accepting cash or credits used for wagers on the wager-based game;
a value output device for dispensing at least credits redeemable for cash;
a player input panel communicatively coupled to the game controller configured to receive inputs associated with the wager-based game;
a main display communicatively coupled to the EGM configured to show an outcome to a wager-based game;
a secondary display for outputting one or more mobile device related indicators for conveying information to a user of the EGM relating to a mobile device, wherein at least one of the indicators is for conveying whether the mobile device is currently in wireless communication with a gaming system, and wherein the mobile device has a mobile device display; and
a secondary controller configured to communicate with the mobile device and the game controller, such that the mobile device communicates with the game controller via the secondary controller, and wherein the communication between the mobile device and the game controller includes the game controller being configured to directly send information to the mobile device while the secondary controller is configured to screen information from the mobile device to the game controller.

24. The EGM of claim 1, further comprising a third display positioned above the main display.

* * * * *